Patented Mar. 29, 1932

1,851,363

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF ORGANIC COMPOUNDS

No Drawing.     Application filed January 30, 1929.  Serial No. 336,335.

This invention relates to the catalytic oxidation of organic compounds, particularly in the vapor phase.

In my prior patents No. 1,694,122 dated December 4, 1928 and No. 1,722,297 dated July 30, 1929 and co-pending application Serial No. 294,597 filed July 21, 1928 processes have been described and claimed for the catalytic oxidation of organic compounds in which a contact mass is used containing a zeolite as one of its catalytically active components or derivatives of zeolites, such as the reaction products of zeolites with anions capable of forming therewith salt-like bodies, or acid leached zeolites. The structure of the zeolite and its chemical constitution were considered to be essential factors in the success of the process. Surprising as it may seem, I have now found that it is possible to prepare effective contact masses for the catalytic oxidation of organic compounds which contain non-base exchanging silicates or polysilicates of the catalytically active elements. These contact masses are very efficient and although they are not base exchange bodies they appear to share many of the valuable operating characteristics of contact masses which contain zeolites. A very wide field is opened since it is not necessary to form the silicates of the present invention under carefully controlled conditions which result in the production of zeolites. On the contrary, the silicates may be prepared in solutions which are neutral or acid to litmus and many catalytically active elements which are so strongly basic as to be difficultly introduced into the nucleus of zeolites can be effectively used as, of course, they form neutral or polysilicates of non-base exchanging character with ease. This wider fi.' of choice constitutes one of the advantages i the present invention.

The silicates of the present invention may be used in the form of undiluted compounds but the best results are obtained when they are diluted, preferably during formation and at any rate before setting, with diluents of various types, such as, for example, porous material as kieselguhr, pumice meal, glaucosil, and the like, with catalytically active material such as impregnated kieselguhr, finely divided, catalytically active, silicious or non-silicious, base exchange bodies and their derivatives, etc. It should be understood, however, that the present invention is limited to contact masses which when freshly prepared contain at least one silicate having a catalytically active element in chemical combination therewith. It is possible to use any of the known catalytically active metal elements which are capable of forming silicates, which elements have been described in the prior patent and applications above referred to. Where it is desired to oxidize organic compounds to intermediate oxidation products, the metal elements of the fifth and sixth groups of the periodic system are those most used and the silicates of vanadium in various stages of oxidation are particularly effective, for example vanadyl silicate, vanadous silicate, complex non-base exchanging silicates containing vanadium in various stages of oxidation, and the like.

The silicates used in the present invention may be prepared in various ways; for example, they may be prepared by the reaction of soluble silicates with one or more metal salts or with both metallates and metal salts, the conditions of course being such that zeolites are not formed. The salts and metallates may be simple or complex compounds such as ammonia complexes, cyanogen complexes, etc. In this manner simple silicates may be prepared, an example of which is the reaction between vanadyl sulfate and waterglass, or where a plurality of metallates or metal salts or both are used complex silicates are obtained. Thus, for example, the reaction product of waterglass with vanadyl sulfate and aluminum sulfate gives a complex silicate containing both aluminum and tetravalent vanadium. Such a complex silicate is frequently more efficient than is a simple silicate. Complex silicates may also be prepared by the reaction of three types of components, that is to say at least one silicate, at least one metallate and at least one metal salt, under conditions which will not produce a zeolite.

Diluents may be introduced in any of the nine methods described in my prior application Serial No. 294,597 filed July 21, 1928. I prefer to use diluted silicate contact masses as they are usually more effective than the undiluted in which frequently the concentration of the catalytically active elements is unfavorable for best results.

(1) The diluents may be mixed with one or more liquid components of the base exchange bodies to be formed when the latter are prepared by wet methods.

(2) Components, either catalytically active, stabilizer promoters, or others, may be precipitated or impregnated into diluent bodies which are then incorporated into the base exchange bodies by any suitable methods of incorporation.

(3) Diluents may be mixed with base exchange bodies when the latter are still in the form of gels, by kneading or stirring, in which case the base exchange gel behaves as an adhesive. The homogeneity and uniformity of the distribution of the diluents is of course not quite so great by this method as by method (1), but for many catalytic oxidations of organic compounds extreme uniformity is not essential.

(4) Diluents may be formed during the formation of base exchange bodies by mixing suitable compounds with the components of the base exchange bodies so that the diluent particles are precipitated during formation. Protective colloids may be added to prevent coagulation of the diluent particles before the base exchange bodies have become sufficiently set.

(5) Compounds may be added which react with certain of the base exchange bodies forming components to produce diluents, for instance salts of the metal acids of the fifth and sixth groups may be added in sufficient excess so that they react with components of the base exchange body to form insoluble diluents, as for example with heavy metal oxides.

(6) Preformed base exchange bodies, diluted or undiluted, artificial or natural, can be impregnated with true or colloidal solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which after formation retains the compounds in solution and is dried without washing or is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

Where it is desired to oxidize selectively certain impurities in mixtures of organic compounds such as, for example, crude anthracene, metal elements other than those of the fifth and sixth groups of the periodic system are especially effective. These elements are described in the prior patent and applications above referred to and specifically pointed out in Example 4 of the present specification and it should be understood that the elements there described as capable of entering into the formation of zeolites may be used in forming the non-base exchanging silicates of the present invention and are included therein. The present invention has the additional advantage that may of the elements enumerated in the patent and applications above referred to which are difficult of introduction into the zeolite in non-exchangeable form, requiring in some cases the use of complex compounds, readily form simple or complex non-base exchanging silicates and it is normally not necessary to introduce them in the form of complex compounds. While it is an advantage of the present invention that many such elements can be introduced in a more simple form than in the case of zeolite contact masses, it should be understood that the invention is in no sense limited to the introduction of the elements referred to in the form of simple compounds and, on the contrary, they may be introduced in the form of any of the complex compounds described in the aforementioned patent and applications. It is sometimes of advantage to use easily decomposable complex compounds or to introduce diluents which can be readily removed or destroyed either by heating, leaching or other means, as by the introduction of such compounds and their subsequent destruction or removal, additional porosity can be given to the simple or complex silicates which greatly enhances their catalytic effectiveness.

The silicate catalysts of the present invention not only are in many cases more easily prepared than zeolite catalysts and afford a wider choice of elements but they share to a great extent the advantages of zeolite catalysts such as adequate resistance to high temperatures, satisfactory mechanical strength, and the like. Where highly diluted silicate catalysts are used in the present invention, sometimes the amount of silicate is not sufficient to give as great mechanical strength as is desired. In such cases it is frequently desirable to wash the diluted silicate with a dilute solution of a soluble silicate such as waterglass to effect surface silicification which increases the mechanical strength of the contact mass and such after-treated contact masses are of course included in the present invention. Compounds of the alkali and alkaline earth metals may also be used to supply additional cementing power and to tone the catalyst.

The simple and complex silicates which constitute the novel catalysts of the present invention in some cases may undergo secondary chemical transformations by reason of preliminary calcination treatment, such as those described in the following examples or they may be changed in the catalysis itself. Therefore, the catalysts and contact masses of the present invention will be described and claimed as of the time when they are freshly prepared as is usual in catalytic nomenclature.

When the catalytically active components are present both in chemical combination with the silicate and in the diluent, the latter may be silicious or non-silicious. Thus diluents containing finely divided material, such as kieselguhr, impregnated with catalytically active components may be used as described above or base exchange bodies or their derivatives which are catalytically active may be used as diluents. These catalytically active base exchange bodies which are used as diluents of the catalytically active silicates may be two-component or multi-component zeolites or they may be non-silicious base exchange bodies or acid leached derivatives of zeolites or non-silicious base exchange bodies. It should be understood that the use of catalytically active base exchange bodies or their derivatives in the oxidation of organic compounds is not claimed broadly in the present invention, but forms the subject matter of my prior patent and applications above referred to and also of my prior Patent No. 1,735,763, dated November 12, 1929. In the present application the use of catalytically active non-silicious base exchange bodies is claimed only in combination with the catalytically active non-base exchanging silicates which form the important feature of the present invention.

The present invention is applicable to the catalytic oxidation of organic compounds generally, of which the following reactions are typical examples:

1. Reactions in which an intermediate oxidation product is produced. The oxidation of benzol, toluol, phenol, tar phenols or furfural and other compounds containing the groups —CH$_2$—CH=CH—CH$_2$— to maleic acid and fumaric acid or mesotartaric acid; cresol to salicylaldehyde and salicylic acid; toluol and the various halogen and nitro substituted toluols to the corresponding aldehydes and acids; xylenes, pseudocumene, mesitylene, paracymene and other derivatives to the corresponding aldehydes and acids; naphthalene to naphthaquinone, phthalic anhydride and maleic acid; phthalic anhydride to maleic acid and fumaric acid; anthracene to anthraquinone; phenanthrene to phenanthraquinone, diphenic acid, phthalic anhydride and maleic acid; acenaphthene to acenaphthylene, acenaphthaquinone, bisacenaphthylidenedione, naphthaldehydic acid, naphthalic anhydride and hemimellitic acid; fluorene to fluorenone; eugenol and isoeugenol to vanillin and vanillic acid; methyl alcohol and methane to formaldehyde; ethyl alcohol to acetic acid; ethylene chlorhydrine to chloracetic acid and the like.

2. Reactions in which an undesired impurity is burned out, such as the purification of crude anthracenes of various degrees of impurity with total combustion of carbazole, dead oils and in some cases phenanthrene; purification of crude naphthalenes and crude mononuclear hydrocarbons, such as benzols and the like; purification of ammonia from coal tar with the burning out of the organic impurities such as phenolic bodies present, etc.

3. Oxidation of mixtures of organic compounds to desired intermediate products with removal of impurities such as the oxidation of crude anthracenes, phenanthrenes, and the like to intermediate products such as anthraquinone, phenanthraquinone, diphenic acid, phthalic anhydride, and the like with concomitant removal of carbazole and dead oils by total combustion; the oxidation of crude tar acids to maleic and fumaric acids with the combustion of certain impurities, etc.

In the oxidation of organic compounds, the use of stabilizers, that is to say compounds of the alkali metals, alkaline earth metals, and strongly basic earth metals whose oxides are not reducible with hydrogen, is very important as by means of these stabilizers the activity of the contact masses can be toned so as to provide a maximum effectiveness in the desired reaction with a minimum of undesired reaction. In many cases the addition of catalytically active components which are not specific catalysts for the particular reaction in question and which will be referred to as "stabilizer promoters" is also of importance. I have described and claimed the catalytic oxidation of organic compounds generally by means of contact masses containing stabilizers or stabilizer promoters in my prior Patent No. 1,709,853 dated April 23, 1929. The catalytically active silicate contact masses of the present invention may have associated in or with them stabilizers and stabilizer promoters, as described in the application above referred to and also in the patent and applications referred to in the second paragraph of this specification. The use of stabilizers or stabilizer promoters is, of course, not claimed broadly in the present application but only in conjunction with the catalytically active silicates of the present invention. The operation of these stabilizers and stabilizer promoters is the same in the contact masses of the present invention as those described in the patent and applications above referred to, and, thus, for example, the use of strongly alkaline stabilizers in reactions where heterocyclic impurities are burned out as in the catalytic purification of crude anthracene, etc. applies equally to the contact masses of the present invention.

The invention will be described in greater detail in connection with the following specfic examples, without however being limited to the details therein set forth.

*Example 1*

16 parts of vanadic acid are formed into a slurry with 300 parts of water and are acidified with sulfuric acid. The mixture is heated to gentle boiling and a stream of $SO_2$ is passed through the hot suspension until it is transformed into a blue solution of vanadyl sulfate. The vanadyl sulfate is then poured into a solution containing 140 parts of 39° Bé. potassium waterglass diluted with 500 parts of water, vigorous agitation being provided and the introduction being continued until the reaction mixture is neutral or slightly acid to litmus. If desired, the mixture may be effected in the reverse order, that is to say, the waterglass solution may be poured into the vanadyl sulfate solution. If the final reaction mixture is not neutral or acid to litmus, it may be adjusted by the addition of small amounts of organic or mineral acids such as acetic or hydrochloric acid. If the reaction mixture is too acid the excess acidity may be neutralized by means of alkali. The gray-green reaction product is separated from the mother liquor in a Nutsch filter, dried, preferably at an elevated temperature and then broken into fragments. The contact mass, which is a vanadyl polysilicate, is then ready for use in the catalytic oxidation of organic compounds. Normally, it is not necessary to use the contact mass in as concentrated form as that described above, and for best efficiency the contact mass may be impregnated or coated onto natural or artificial carrier masses which are described below. If desired, of course, the carrier fragments may be coated or impregnated with the vanadyl polysilicate which is formed in situ. Thus, for example, the carrier fragments may first be coated with potassium waterglass and then the vanadyl sulfate sprayed on.

Instead of coating the vanadyl polysilicate onto massive carrier fragments, finely divided diluents of various types, either inert, activating or themselves catalytically active, may be incorporated into the polysilicate during formation or before it has set. Any of the diluents, described in the patent and applications referred to in the introductory portion of the specification, may be used. "Celite" earth, diatomaceous or "celite" brick refuse are cheap and useful diluents. The diluted contact mass may contain 60-80 parts of "celite" brick refuse based on the quantities of reagents described in the first paragraph of this example.

Highly diluted vanadyl polysilicates sometimes show insufficient mechanical strength when formed into contact mass pellets, and in such cases it is desirable to mix the diluted vanadyl polysilicates when freshly prepared with substances which have cementing power, such as compounds of the alkali and alkaline earth metals, especially potassium hydroxide, potassium carbonate, potassium sulfate, potassium bisulfate, potassium nitrate, or nitrite and the corresponding compounds of the alkaline earth metals. The amount of cementing material should be such that the contact mass granules after formation possess the necessary strength for use in the catalytic oxidation of organic compounds and do not dust. In general, from 10-20% of cementing materials based on the weight of the diluted polysilicate is sufficient. The cementing agents also have a catalytic action as they are stabilizers for the catalytic oxidation of organic compounds.

Very efficient contact masses may also be prepared by a modified procedure in which the vanadyl sulfate prepared as described above, is treated with 10 N. potassium hydroxide to transform it into the coffee-brown potassium vanadite. The potassium vanadite is then mixed with the waterglass, and 2 N. sulfuric acid solution is gradually introduced with vigorous agitation until the reaction mixture is neutral or acid to litmus. It is advantageous to add the sulfuric acid in two stages, first adding enough to bring the reaction mixture to neutrality or slight alkalinity to phenolphthalein, and the reaction permitted to proceed for some time at 50-60° C. During this intermediate step a vanadyl zeolite is obtained which is then transformed into a non-base exchanging polysilicate by the addition of the second portion of acid which brings about a neutral reaction to litmus. A particularly favorable structure is obtained by proceeding in this manner. The cake which is obtained by either procedure, is separated from the mother liquor by pressing, dried, and broken into pieces and forms a contact mass which is very rich in capillaries.

Instead of using plain "celite" earth as a diluent, it may be impregnated with 5-10% of its weight of one or more salts of the metal acids of the 5th and 6th group of the periodic system, such as for example, aluminum vanadate, copper vanadate, silver vanadate, manganese vanadate, cobalt vanadate, iron vanadate or the corresponding tungstates, molybdates, tantallates, or chromates. When so impregnated, the diluent is catalytically active and increases the effectiveness of the contact mass.

Instead of impregnating the diluent with a catalytically active substance, it may be impregnated with a non-specific catalyst or stabilizer promoter, for example, the "celite"

earth may be impregnated with 5% of one or more oxides of iron, copper, nickel, cobalt, silver, zinc, aluminum, titanium, zirconium, thorium, or cerium. The oxides may be precipitated from the solvent solutions in the "celite" in the usual manner.

Instead of using the finely divided diluents described above, catalytically active or inactive zeolites or non-siliceous base exchange bodies or their derivatives may be used. The base exchange bodies may contain catalytically active or stabilizer promoter exchangeable bases, such as iron oxide, cobalt oxide, nickel oxide, copper oxide, aluminum oxide, tetravalent vanadium and the like. Derivatives of the base exchange bodies such as their reaction products with anions to form salt-like bodies, for example, with salts of the metal acids of the 5th and 6th groups of the periodic system may be used. A further very effective class of diluents is represented by the acid leached base exchange bodies, siliceous or non-siliceous, which may be catalytically active or inactive. The leaching is effected as described in my prior application No. 294,597, filed July 21, 1928, referred to above. The leaching may be carried out to the point where part or all of the exchangeable bases are removed. The high porosity or capillarity of the base exchange bodies and their derivatives makes them very desirable diluents for the catalytically active silicates of the present invention.

When alkalies are used as stabilizers or cementing agents, it is advantageous to neutralize them before the contact mass is used for the oxidation of organic compounds. This may be effected by impregnating them with inorganic or organic acids in suitable amounts or by subjecting the contact mass to the action of 4–6% $SO_2$ at 400–500° C. In many cases, however, this is not necessary, especially where the alkali is not troublesome even in the production of organic acids by oxidation and it is still less necessary for the production of non-acidic carbonyl compounds. In the purification of organic compounds by burning out undesired impurities, the strongly alkaline stabilizers are desirable and when the contact mass is to be used for such purposes the alkalinity should preferably be allowed to remain.

The contact masses described above may be used in the catalytic oxidation of benzol, toluol, naphthalene, phenol, tar phenol or furfural to maleic acid, the hydrocarbons or compounds being mixed with air in the ratio of 1:30 by weight and passed over the contact mass at 380–450° C. Accurate temperature control should be provided and the reaction may advantageously be carried out in tubular bath converters.

In the oxidation of benzol, phenol, tar phenols, and furfural to maleic acid, it is advantageous to mix them with so-called protective agents which are either readily oxidizable and reduce the undue activity of the catalyst or which are difficultly oxidizable and appear to slow down the total combustion reactions. Examples of the first class are methanol, gasoline and the like, whereas carbon tetrachloride is a good example of the second class. When protecting agents are used the yields of the maleic acid can be increased.

In carrying out the reaction, it is also frequently of advantage to use an oxidizing gas having a lower percentage of oxygen than air, with or without protecting agents. A process in which a part of the reacted gases are recirculated may also be used with effect.

If the diluted vanadyl silicate contact mass contains copper oxide, silver oxide, aluminum oxide or the corresponding vanadates it may be used for catalytic oxidation of naphthalene to phthalic anhydride. Naphthalene vapors mixed with air in the ratio of 1:18 are passed over the contact mass at 370–420° C. Yields of 75–80% of theory are readily obtained. Contact masses in which the vanadyl silicate contains silver or copper oxide may also be used for the catalytic oxidation of methyl alcohol or methane to formaldehyde under similar reaction conditions as described above.

*Example 2*

22 parts of ammonium vanadate or a corresponding amount of potassium vanadate are formed into a slurry with 200 parts of water and are then reduced at 90–100° C. to the vanadite by means of a vigorous stream of sulfur dioxide. Sufficient 10 N. KOH solution is added to transform the ammonium vanadite to the coffee-brown potassium vanadite. Thereupon the solution is mixed with 140 parts of 33° Bé. potassium or sodium waterglass diluted with 300–400 parts of water. Materials rich in $SiO_2$, such as glaucosil (the acid treated residue of greensand), diatomaceous earths, comminuted fragments of natural or artificial silicates either base exchanging or non-base exchanging, especially zeolites or non-siliceous base exchange bodies which have been diluted with materials rich in silica, are incorporated into the mixture, the amount being from 60–80 parts. If desired a corresponding amount of aluminum oxide or titanium oxide can be used as a diluent. 20–30% aluminum sulfate solution is added until the reaction mixture is neutral or acid to litmus. The cake formed is separated from the mother liquor in the usual way, dried first at 100–150° C., heated in an air stream to 400–500° C., preferably in the presence of $SO_2$ gases and then broken into suitable pieces, which form a very efficient contact mass for the catalytic oxidation of naphthalene to phthalic anhydride.

If the fragments before calcination do not possess the requisite physical strength, they may be treated with 5-15% of various adhesives, such as diluted waterglass or solutions of alkali metal compounds. The preferred method consists in washing the freshly prepared cake with fairly dilute waterglass.

The vanadite component in the contact mass described above may be partly replaced by other metallates and the metal salt component may be partly or entirely replaced by a corresponding amount of one or more other metal salt solutions, such as those of titanium, zirconium, thorium, cadmium, copper, chromium, iron, cobalt, nickel, cerium or vanadium. Where aluminum, titanium, zirconium, thorium, copper or nickel are used as metal salt components, the contact mass is particularly useful for the catalytic production of organic acids. When placed in a tubular bath converter having tubes of ½ to ¾", containing 170-200 c. c. of contact mass per tube each tube can be loaded with 10-20 grams of naphthalene per hour, which is mixed with air in the ratio of 1:18 by weight and passed over the contact mass at 380-400° C. bath temperature. Yields of 70-80% of the theory of very pure phthalic anhydride are obtained.

In the same way acenaphthene or acenaphthylene can be oxidized to very pure naphthalic anhydride but when oxidizing acenaphthene the loading per tube should be from 3-5 grams per hour in order to permit high yields. Substituted acenaphthenes, such as halogen substituted acenaphthenes may also be oxidized to the corresponding substituted naphthalic anhydrides.

The same contact masses may be used for preparing maleic acid from aliphatic compounds or hydrocarbons having the grouping:

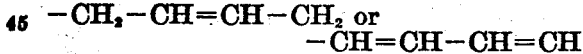

Heterocyclic compounds such as furfural and thiophene, which also have this linkage, may also be effectively oxidized to maleic acid. In oxidizing these substances to maleic acid, it is sometimes desirable to use so-called protective agents, such as easily oxidizable substances or substances which strongly resist oxidation and slow down the reaction. The first class of substances appears to react with the most active oxygen of the catalyst and prevents burning up of the maleic acid. Where difficultly oxidizable compounds such as, for example, carbon tetrachloride, are used, the effect is probably mainly one of dilution. The protective catalysis is not claimed generally in the present invention, it being the subject matter of my co-pending applications Serial No. 339,742 filed Feb. 13, 1929, and Serial No. 338,614 filed Feb. 8, 1929, and is only claimed in connection with the catalytically active non-base exchanging silicate contact masses of the present invention.

Whether or not the oxidation to maleic acid is carried out with protecting agents, it is frequently desirable to recirculate at least a part of the gases, carrying out the process with oxidizing gases having a lower oxygen content than air.

When the salt component of the silicate contact masses described above consists of salts of iron, cobalt, or manganese, the resulting contact masses preferentially oxidize aromatic hydrocarbons to non-acidic carbonyl compounds, for example: anthracene to anthraquinone; naphthalene to alpha-naphthaquinone; fluorene and its dehydrogenation or substitution products to the corresponding fluorenones; fluoranthene to fluoranthenequinone; retene to retenequinone; pyrene to pyrenequinone; chrysene to chrysoquinone; and picene to picenequinone. For example, anthracene of various grades of purity ranging from 85-100% is uniformly vaporized in an air stream at the ratio of 1:25 by weight and passed over the contact mass in the tubes at 380-400° C. bath temperature, with a loading of 3-5 grams per tube per hour. Extremely pure anthraquinone is obtained with yields of 85-92% of the theory.

*Example 3*

210-250 parts of 33° Bé. potassium waterglass solution diluted with 15-20 volumes of water are mixed with kieselguhr until a suspension is obtained which just remains stirrable. 18 parts of $V_2O_5$ are dissolved in sufficient 10-20% caustic potash solution to form potassium vanadite, and 18 parts of $V_2O_5$ are reduced to the blue vanadyl sulfate in the usual manner in the presence of 200-300 parts of water. The waterglass suspension and the vanadite solution are poured together and the vanadyl sulfate solution is permitted to flow in with vigorous agitation until the reaction mixture is neutral or slightly acid to litmus; if the amount of vanadyl sulfate is not sufficient, some 2 N. sulfuric acid may be used. A dirty gray-blue gel is obtained which is filtered with suction, washed with a little water, and dried, and constitutes a diluted, catalytically active polysilicate. The contact mass, after calcination, is well suited for the catalytic oxidation of crude anthracene to high grade anthraquinone, 45-50% anthracene being uniformly vaporized with air in the ratio of 1:35 by weight and passed over the contact mass at 380-450° C. bath temperature.

The same contact mass can also be used for the catalytic oxidation of toluol and various halogen or nitro-substituted toluols to the corresponding benzaldehydes and benzoic acids; cresol to salicylicaldehyde and salicylic acid; and xylene, pseudocumene, mesitylene, paracymene and their derivatives to the corresponding aldehydes and acids. In oxidizing toluol and substitution products of toluol or other aromatic hydrocarbons containing aliphatic side chains, the use of protective agents is very desirable and greatly improves the yields. If methanol is used as a protective agent, formaldehyde is produced as a by-product.

Silicate-containing contact masses in which small amounts of iron and manganese oxides have been precipitated in the diluent show higher efficiency in the oxidation of anthracene to anthraquinone and of acenaphthene to naphthalic anhydride and hemimellitic acid. Instead of impregnating the kieselguhr with metal oxides, it may be impregnated with 5-10% of its weight of salts of the metal acids of the fifth and sixth groups of the periodic system, such as salts of the acids of vanadium, tungsten, molybdenum, uranium, and tantalum. These contact masses are well suited for the catalytic purification of coal tar ammonia by selective total combustion of the organic and inorganic impurities producing ammonia of high purity. The coal tar ammonia, mixed with air in sufficient quantity to give a large excess of oxygen over that required for the total combustion of the organic impurities and the conversion of sulfur compounds to $SO_3$, is passed over the contact mass at 420-450° C.

This example illustrates the combination of catalytically active silicates with stabilizers and stabilizer promoters which are very effective for the catalytic oxidation of organic compounds to intermediate oxidation products.

*Example 4*

A solution containing 48 to 69 parts of $SiO_2$ in the form of 33-36° Bé. potassium waterglass solution, diluted with 10-12 volumes of water, is treated with sufficient 20% ammonia water until the cloudiness which forms at first is cleared up. 29 parts of cupric nitrate with 6 mols of water are dissolved in water to form N/10 solution and sufficient concentrated ammonia water is added until the precipitate which at first forms dissolves as a complex cuprammonium compound. The cuprammonium-nitrate solution is poured into the waterglass with vigorous agitation and then a 10% aluminum nitrate solution is gradually added to the mixture until it reacts neutral to litmus. The blue gel thus produced is pressed and dried, forming greenish-blue fragments which show a conchoidal fracture.

The cuprammonium complex may be replaced partly or wholly by corresponding amounts of other complex compounds, such as nickel complexes and similarly the aluminum nitrate can be partly or wholly replaced by corresponding amounts of one or more metal salt solutions, such as those of copper, nickel, iron, manganese, cobalt, silver or cerium.

The contact masses described above are effective in the selective purification of various grades of crude anthracene and semi-purified anthracene, the carbazole being burned out to a large extent and the phenanthrene being also strongly attacked in some cases. The resulting purified anthracene then contains phenanthrene as practically the only impurity. This purified anthracene can be further purified by well known methods, for example by recrystallization at 80-100° C. from a minimum amount of solvent naphtha or other well known solvents for phenanthrene. After a single recrystallization in many cases the anthracene obtained is between 95-98% pure and practically colorless, being excellent material for the manufacture of dyes and intermediates.

Crude anthracene containing 30-35% anthracene may be uniformly vaporized with air in the ratio of 1:40 and passed over the contact mass at 390-450° C. A 70-80% anthracene is obtained containing practically no carbazole, the impurities being substantially phenanthrene with traces of oil. A single recrystallization from a phenanthrene solvent gives a 92-95% anthracene, and phenanthrene of a very high purity can be recovered from the mother liquor. If higher grades of anthracene are used, especially those which have been freed to a large extent from phenanthrene but which still contain large amounts of carbazole, 90-98% anthracene can be produced directly by this catalytic process.

Instead of using concentrated silicate contact masses, the same efficiency can be obtained by diluting the silicate with kieselguhr, pumice meal or ground quartz, or, if desired, the contact masses may be coated onto artificial or natural carrier fragments, such as pumice stones, quartz filter stones or roughened quartz, using an alkali as a cement. It is also possible to form a silicate on the carrier in situ.

The contact masses described in this example can also be used for purifying crude naphthalene and other crude aromatic hydrocarbons and mixtures of crude hydrocarbons which are obtained from coal tar.

*Example 5*

15 parts of $V_2O_5$ alone or mixed with 4 parts of $WO_3$ are dissolved in 300 parts of a potassium hydroxide solution containing sufficient KOH to form the corresponding potassium metallates. About 80 parts of "celite" earth are added to this solution with vigorous agitation. Other diluents, as described in the foregoing examples may be used. The suspension is heated to 80-90° C. and is then gradually made faintly acid to congo, using 2 N. sulfuric acid in order to precipitate $V_2O_5$ and $WO_3$ in the diluent. Thereupon the mixture is freed from the mother liquor. Instead of precipitating $V_2O_5$, other metal acids of the fifth and sixth groups of the periodic system may be precipitated in the same manner.

2 parts of freshly precipitated $Al_2O_3$ are transformed into potassium aluminate by means of a 5 N. potassium hydroxide solution and are then mixed with 40 parts of 33° Bé. potassium waterglass. Immediately after mixing, the "celite" containing $V_2O_5$ and $WO_3$ is kneaded in until the mixture is neutral to litmus, part of the oxides in the diluent reacting with the waterglass to form complex silicates. The mass may then be formed into suitable pieces and after calcination in air is ready for use.

50-70% crude anthracene is vaporized in air in the ratio of 1:35 by weight, preferably by spraying the liquid anthracene into the air, and passed over the contact mass at 380-450° C., the reaction taking place in a tubular bath converter provided with a bath composition which boils near or at the most favorable reaction temperature. A good grade of anthraquinone is obtained, the impurities such as carbazole and phenanthrene being substantially burned out. Other carbonyl compounds can be prepared by means of this contact mass from their respective hydrocarbons.

The mass may be used for the oxidation of naphthalene to phthalic anhydride if metal acids of the fifth and sixth groups of the periodic system are present in the contact mass, such as tungsten, tantalum, or molybdenum. It may also be used for the catalytic oxidation of aromatic compounds containing side chains to the corresponding aldehydes and acids.

*Example 6*

Effective contact masses for the catalytic oxidation of organic compounds can be obtained by combining catalytically active silicates with diluted or undiluted base exchange bodies which may or may not contain $SiO_2$ in non-exchangeable form, or their derivatives such as salt-like bodies or leached compositions. These complex contact masses may be prepared in various ways; thus, for example the silicates may be embedded in base exchange bodies which are the reaction products of two or more classes of components or vice versa, care being taken that at least one catalytically active element or radical is chemically combined in the non-base exchanging silicate. An example of such contact masses is as follows:

16 parts of vanadic acid are formed into a slurry with 200 parts of water, acidified with sulfuric acid, and reduced to a blue vanadyl sulfate solution in the usual manner. This solution is divided into two portions in the ratio of 1:2. One-third of the vanadyl sulfate solution is cautiously treated with a concentrated caustic potash solution until a clear brown potassium vanadite solution is obtained. This is then mixed with 140 parts of 33° Bé. potassium waterglass diluted with 500 parts of water and the remaining two-thirds of the vanadyl sulfate solution is added in a thin stream with vigorous agitation, the mass first solidifying to a gray-green gel and on further stirring is transformed into readily filterable granular aggregates. Care should be taken, of course, that the mixture finally becomes neutral or acid to litmus, if necessary using dilute sulfuric acid to bring about the correct adjustment. The reaction product is pressed, washed with water, dried and ground.

Instead of using undiluted silicates, diluted silicates may be prepared using diluent materials which resist high temperatures such as materials rich in $SiO_2$.

The catalytically active silicates described above may be embedded in many base exchange bodies, siliceous or non-siliceous. A typical base exchange body is prepared by diluting 90 parts of 33° Bé. potassium waterglass with 4-5 volumes of water, incorporating the silicates described above together with unground infusorial earth, vigorous stirring being used to effect uniform distribution and the amount of infusorial earth being so chosen that the mixture just remains easily stirrable. Thereupon 60 parts of aluminum sulphate containing 8 mols of water are dissolved in 200 parts of water and sufficient 20% ammonia water is added to precipitate aluminum hydroxide. The aluminum hydroxide is freed from the mother liquor, washed and treated with sufficient 2 N. potassium hydroxide solution to transform it into potassium aluminate, which is then introduced into the suspension of waterglass and silicates, and the mixture gradually heated to about 60° C. A gelatinous precipitate is obtained which may be increased by the gradual addition of 2 N. sulfuric acid. The addition of the latter, however, should stop when the reaction mixture becomes weakly alkaline to phenolphthalein. A zeolite is produced containing the catalytically active silicates as diluents.

Instead of producing a zeolite the reaction mixture may be made neutral or slightly acid to litmus, in which case silicate bodies are embedded in other non-base exchanging silicates, the gelatinous precipitate in each case being pressed, washed with 200 parts of water in small portions, dried, and broken into pea sized fragments. Other modifications are possible by combining the catalytically active silicates or a mixture of silicates and other diluents in diluted or undiluted non-siliceous base exchange bodies or their derivatives.

A very useful catalytically inactive diluent may be prepared by transforming 10 parts of freshly precipitated $Al_2O_3$ into potassium aluminate with 2 N. potassium hydroxide solution leaving a 10% excess of alkali, 70–80 parts of "celite" brick refuse or other comminuted acid resistant minerals are stirred in, and then there is added in small portions an aluminum sulfate solution prepared by dissolving 66 parts of aluminum sulfate with 18 mols of water in about 200 parts of water. Care should be taken that the reaction mixture remains slightly alkaline to litmus. The reaction product obtained is freed from the mother liquor, dried at temperatures below 100° C. and pulverized, constituting a diluted catalytically ineffective base exchange body which is an excellent diluent for the contact masses of the present invention.

Another effective diluent is obtained by acid leaching the non-siliceous base exchange body described immediately above or by permitting the reaction mixture to become neutral or slightly acid to litmus, in which case an aluminum oxide complex is obtained which does not show base exchanging power. Instead of using the non-siliceous base exchange body or its derivatives as a diluent for the catalytically active silicates, the latter may be embedded in the former either during or after its formation. Another modification consists in hydrating the fragments of the non-siliceous base exchange body described above with water and partly replacing the exchangeable alkali by heavy metal oxides, using 5–10% solutions of silver nitrate, ferric sulfate, copper sulfate, etc. After this treatment, if desired, the base exchange body may be treated with 5–10% solutions of metallates of the fifth and sixth groups of the periodic system, especially soluble vanadate solutions such as ammonium vanadate or potassium vanadate, in order to form the so-called salt-like body of the non-siliceous base exchange body. After such procedure, of course, the product becomes catalytically effective and may be combined with catalytically active non-base exchange silicates to produce contact masses of the present invention.

The aluminate component of the non-siliceous base exchange body may be replaced partly or wholly by other metallates of amphoteric metal oxides and the metal salt component can also be wholly or partly replaced by one or more other salt solutions, such as those of iron, chromium, titanium, or cadmium.

Catalytically active non-siliceous base exchange bodies such as potassium vanadyl vanadates may also be used instead of the inactive non-siliceous base exchange body described above or if desired siliceous base exchange bodies of natural or artificial origin may be used.

The contact masses described are very effective for the oxidation of aromatic compounds to carbonyl compounds, such as the catalytic oxidation of anthracene to anthraquinone, fluorene to fluorenone, or for the oxidation of naphthalene to phthalic anhydride, acenaphthene to naphthalic anhydride, toluol to benzoic acid, or cresol to salicylic acid, under the reaction conditions described above.

*Example 7*

Catalytically active silicates or polysilicates or contact masses containing them as described in the foregoing examples can be coated onto massive carrier fragments of natural or artificial origin, such as, for example, quartz fragments, quartz filter stones, sand stones, silica gel fragments, diatomaceous stones, "celite" bricks, pumice fragments, fragments of natural or artificial silicates either with or without base exchanging power and especially zeolites diluted with materials rich in silica, non-siliceous base exchange bodies or their derivatives. Other massive carrier fragments are unglazed porcelain fragments, aluminum granules, granules of metal alloys such as ferrosilicon, ferrovanadium, and the like. The carrier fragments may be coated either after formation of the contact mass or the contact mass can be caused to react on the carrier fragments and be formed in situ. Thus, for instance, the alkaline components such as waterglass with or without metallate solutions may be first coated onto the carrier fragments and the metal salt components then sprayed on in sufficient amount to produce non-base exchanging silicates. If desired, the order in which the components are coated may be reversed.

Instead of using natural carrier fragments, artificial carrier fragments may be prepared, for example granules formed of "celite", kieselguhr, pulverized silicates, diluted and undiluted zeolites, non-siliceous base exchange bodies and their derivatives using various adhesives such as waterglass or alkali metal salts, the fragments being subjected to a subsequent calcination, preferably at 400–500° C. and if desired treated with inorganic acids such as sulfuric acid, hydrochloric acid, nitric acid, and the like. Other raw materials for these artificial carrier fragments are certain brands of silicates, such as diatomaceous earth treated with lime in the presence of water, with or without heat. The lime may, if desired, be replaced by other oxides or hydroxides, such as those of strontium. Fragments of this type may be calcined and may be carbonated during or after calcination, producing a suitable amount of hydrated calcium metasilicate which is a very useful diluent or carrier fragment for catalytically active silicates or polysilicates.

The ratio of catalytically active silicates to carrier fragments may, for example, be about 1 kilo by weight of diluted or undiluted catalytically active silicates to 10 liters of pea size carrier fragments.

These contact masses are suitable for the various catalytic oxidations of organic compounds referred to in the foregoing examples and in the introductory portion of the specification.

What is claimed as new is:

1. A process of oxidizing organic compounds in the vapor phase, which comprises vaporizing the compounds, admixing the vapors with an oxidizing gas and passing them at an elevated temperature over an oxidation contact mass containing at least one catalytically active non-base exchanging silicate.

2. A process of oxidizing organic compounds in the vapor phase, which comprises vaporizing the compounds, admixing the vapors with an oxidizing gas and passing them at an elevated temperature over an oxidation contact mass containing at least one diluted catalytically active non-base exchanging silicate.

3. A process of oxidizing organic compounds in the vapor phase, which comprises vaporizing the compounds, admixing the vapors with an oxidizing gas and passing them at an elevated temperature over an oxidation contact mass containing at least one catalytically active non-base exchanging silicate, said silicate containing at least one metal element of the fifth or sixth groups of the periodic system in chemical combination.

4. A process of oxidizing organic compounds in the vapor phase, which comprises vaporizing the compounds, admixing the vapors with an oxidizing gas and passing them at an elevated temperature over an oxidation contact mass containing at least one diluted catalytically active non-base exchanging silicate, said silicate containing at least one metal element of the fifth or sixth groups of the periodic system in chemical combination.

5. A process of oxidizing organic compounds in the vapor phase, which comprises vaporizing the compounds, admixing the vapors with an oxidizing gas and passing them at an elevated temperature over an oxidation contact mass containing at least one catalytically active non-base exchanging silicate, said silicate containing at least one compound of an alkali forming metal.

6. A process of oxidizing organic compounds in the vapor phase, which comprises vaporizing the compounds, admixing the vapors with an oxidizing gas and passing them at an elevated temperature over an oxidation contact mass containing at least one diluted catalytically active non-base exchanging silicate, said silicate containing at least one compound of an alkali forming metal.

7. A process of oxidizing organic compounds in the vapor phase, which comprises vaporizing the compounds, admixing the vapors with an oxidizing gas and passing them at an elevated temperature over an oxidation contact mass containing at least one catalytically active non-base exchanging silicate, said silicate also containing at least one catalyst included in the group consisting of hydrogenation catalysts, dehydrogenation catalysts, reduction catalysts, oxidation catalysts which, when used alone, are not specific catalysts for the oxidation of organic compounds.

8. A process of oxidizing organic compounds in the vapor phase, which comprises vaporizing the compounds, admixing the vapors with an oxidizing gas and passing them at an elevated temperature over an oxidation contact mass containing at least one diluted catalytically active non-base exchanging silicate, said silicate also containing at least one catalyst included in the group consisting of hydrogenation catalysts, dehydrogenation catalysts, reduction catalysts, oxidation catalysts which, when used alone, are not specific catalysts for the oxidation of organic compounds.

9. A process of oxidizing organic compounds in the vapor phase, which comprises vaporizing the compounds, admixing the vapors with an oxidizing gas and passing them at an elevated temperature over an oxidation contact mass containing at least one diluted catalytically active non-base exchanging silicate, said diluents including at least one base exchange body.

10. A method of oxidizing aliphatic organic compounds in the vapor phase which comprises causing the aliphatic organic compounds in the vapor phase, to react with an oxidizing agent in the presence of a catalyst containing a catalytically active non-base exchanging silicate.

11. A method according to claim 10 in which the silicate is diluted.

12. A method according to claim 10 in which the silicate has associated therewith at least one compound of an alkali forming metal.

13. A method according to claim 10 in which the contact mass contains at least one catalyst included in the group consisting of hydrogenation catalysts, dehydrogenation catalysts, reduction catalysts, oxidation catalysts which, when used alone, are not specific catalysts for the oxidation of organic compounds.

14. A method according to claim 10 in which the silicate contains at least one metal element of the fifth or sixth groups of the periodic system.

15. A method according to claim 10 in which the contact mass contains vanadium.

16. A method of oxidizing organic impurities from mixtures containing them, which comprises vaporizing the mixture, admixing the vapors with an oxidizing gas, and passing them at an elevated temperature over an oxidation contact mass containing at least one catalytically active non-base exchanging silicate.

17. A method according to claim 16, in which the silicate is diluted.

18. A method according to claim 16, in which the contact mass contains at least one compound of an alkali forming metal and at least one catalyst included in the group consisting of hydrogenation catalysts, dehydrogenation catalysts, reduction catalysts, oxidation catalysts which, when used alone, are not specific catalysts for the oxidation of organic compounds.

19. A method according to claim 16 in which the mixture to be purified is a crude anthracene.

20. A method according to claim 16 in which the mixture to be purified is coal tar ammonia.

Signed at Pittsburgh, Pennsylvania, this 28th day of January, 1929.

ALPHONS O. JAEGER.